(12) United States Patent
Obrachta

(10) Patent No.: US 7,575,702 B2
(45) Date of Patent: Aug. 18, 2009

(54) PINMAT GAP FILLER

(75) Inventor: Kevin L Obrachta, Wichita, KS (US)

(73) Assignee: The Boeing Company, Chicago, IL (US)

( * ) Notice: Subject to any disclaimer, the term of this patent is extended or adjusted under 35 U.S.C. 154(b) by 759 days.

(21) Appl. No.: 10/835,371

(22) Filed: Apr. 29, 2004

(65) Prior Publication Data
US 2005/0242470 A1 Nov. 3, 2005

(51) Int. Cl.
B29C 65/42 (2006.01)
(52) U.S. Cl. .................................... 264/162; 264/261
(58) Field of Classification Search ................ None
See application file for complete search history.

(56) References Cited

U.S. PATENT DOCUMENTS 2,862,543 A * 12/1958 Kaminsky .................. 156/497
4,711,746 A * 12/1987 Drader ..................... 264/36.22
5,252,279 A * 10/1993 Gore et al. ................. 264/154
6,190,602 B1 * 2/2001 Blaney et al. .............. 264/443
7,261,026 B2 * 8/2007 Welch et al. ................ 83/660

FOREIGN PATENT DOCUMENTS

JP 6-198630 * 7/1994
JP 9-177296 * 7/1997

* cited by examiner

Primary Examiner—Edmund H. Lee

(57) ABSTRACT

Methods and apparatus for filling form gaps are disclosed. In one embodiment, a method includes providing a heating and pressurizing dispenser for thermoplastic, heating and pressurizing a thermoplastic in the dispenser, discharging the thermoplastic through a nozzle attached to the dispenser and filling the gap in a form with the discharging thermoplastic from the nozzle. In other aspects of the invention, the thermoplastic includes polypropylene with talc. In another aspect of the invention, a composite product is produced by providing a form, and filling the gaps in the form with thermoplastic, and forming the composite product against the form. In yet another aspect to the invention, a high temperature and high pressure dispenser for filling gaps in forms is provided.

21 Claims, 2 Drawing Sheets

PINMAT GAP FILLER

FIELD OF THE INVENTION

This invention relates generally to forming processes, and more specifically, to methods for assembling forms.

BACKGROUND OF THE INVENTION

Form mats with grids of sharp pins are often used for forming acoustical surfaces in many applications, including aircraft engine covers such as cowls or nacelles. Pin areas or pinbeds are assembled from sections or sheets with grids of sharp pins, known as pinmats. The pins on these pinmats perforate the material being fabricated during lay-up and forming, forming an acoustically dampening surface. Surfaces formed with pinbeds often include fiber resin composites typically used for aircraft components. Pinbeds may be assembled by placing segments of pinmats on an underlying form or tool. The pinmats are cut to shape and adhered to the tool or form to produce a pinbed area on the form. Using several pinmats or trimmed pinmat sections, large and/or contoured areas on a form may be covered with pinmats. The material to be formed is then laid up on the form with the covering pinmats, or the form and the pinmats are pressed against the material being formed. After the form is removed from the product, the product is left with a perforated surface.

In other applications, contoured surfaces, ribbed surfaces, or smooth surfaces may be produced during lay-up and/or curing of formed products by utilizing textured mats attached to an underlying form or tool. As with pinmats, the textured mat is placed against the product being formed, leaving the desired surface after cure and removal of the form.

During assembly of pinbeds with pinmat segments, it is sometimes difficult to obtain tight contact between adjoining pinmats attached to the underlying form or tool. For example, a prior art pinbed 3 including four adjoining pinmats 5 with pins 7 is shown in FIG. 1. Between the pinmats 5 are gaps 10. The gaps 10 may also include corner mismatches, such as the corner mismatch 11, where adjoining corners of pinmats 5 meet. In this example prior art pinbed 3, there are approximately 100 pins square inch. The pins 7 are molded integrally with a backing mat. The pins 7 are approximately one-eighth inch high, and the mat is approximately one-eighth inch thick. The gaps 10 between the adjoining pinmats 5 may form a space where the material being formed can migrate during lay-up and cure, to a detriment of the final surface on the finished product.

More specifically, during forming and cure of heat activated fiber resin composites, such as utilized in aircraft, gaps 10 in the pinbed 3 can lead to resin lumps and lines in the final surface that need to be sanded down or otherwise corrected. Resin migration into the gap 10 can also occur, leaving a deficit of bonding resin or fiber movement in areas of the product adjoining the gaps. The gaps 10 can thus result in hand corrective work on the component being formed, and sometimes to the discard of the component. Resin may also penetrate gaps 10 and stick to the underlying forms (not shown), resulting in effort to clean the forms for subsequent use prior to subsequent forming operations. This may also cause undue wear or damage to the forms.

Gap filler materials have been utilized to fill gaps 10 in pinbeds 3 to decrease the difficulties resulting from gaps in the forming pinmats. The gap filler material contacts the part being formed prior to and during cure. Thus the material is preferably compatible with the underlying component material. Epoxy-based materials have been used as gap fillers, but can bond to the underlying tool. The use of epoxy materials for gap filling also includes curing time, and the epoxy can shrink, leaving part of the gap unfilled. Sheet adhesives compatible with fiber resin composites have been utilized to fill gaps. The film adhesive is cut into strips and rolled into "noodles." The "noodles" are stuffed into gaps 10 by hand using a putty knife. With the installation of the film adhesive noodles done by hand, considerable time can be consumed filling forming gaps between the pinmats, especially in complex cured surfaces.

Therefore, a need exists for efficient application of a form gap filling material.

SUMMARY OF THE INVENTION

Methods and an apparatus for filling form gaps are provided. In one embodiment, a method includes providing a heating and pressurizing dispenser for thermoplastic, heating and pressurizing a thermoplastic in the dispenser, discharging the thermoplastic through a nozzle attached to the dispenser and filling the gap in a form with the discharging thermoplastic from the nozzle. In other aspects of the invention, the thermoplastic includes polypropylene with talc. In another aspect of the invention, a composite product is produced by providing a form, and filling the gaps in the form with thermoplastic, and forming the composite product against the form. In yet another aspect to the invention, a high temperature and high pressure dispensers for filling gaps in forms is provided.

BRIEF DESCRIPTION OF THE DRAWINGS

The preferred and alternative embodiments of the present invention are described in detail below with reference to the following drawings.

DETAILED DESCRIPTION OF THE INVENTION

The present invention relates to methods and an apparatus for filling gaps in forms. Many specific details or certain embodiments of the invention are set forth in the following description and in FIGS. 2 through 4 to provide a thorough understanding of such embodiments. One skilled in the art, however, will understand that the present invention may have additional embodiments, or that the present invention may be practiced without several details described in the following description.

Figure 1:
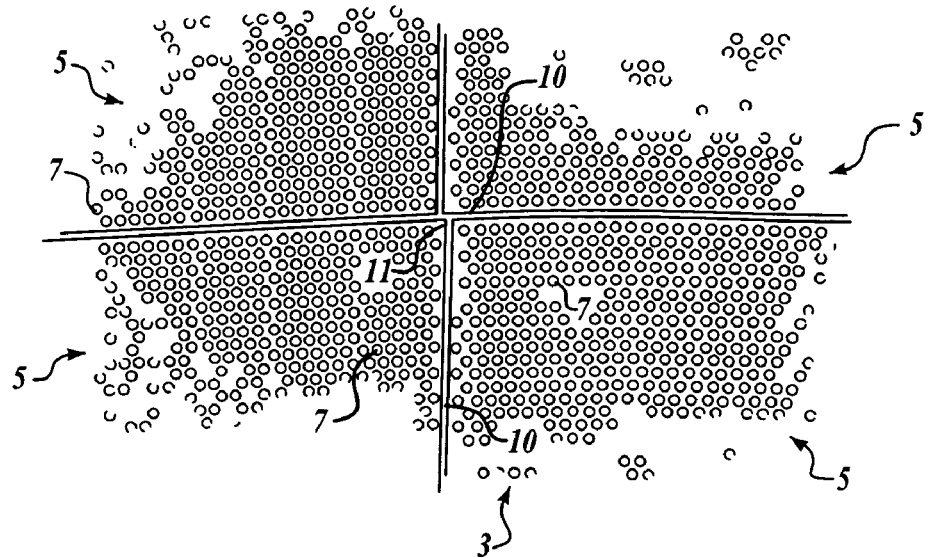
FIG. 1 is a plan view of a prior art pinbed with gaps.
Figure 2:
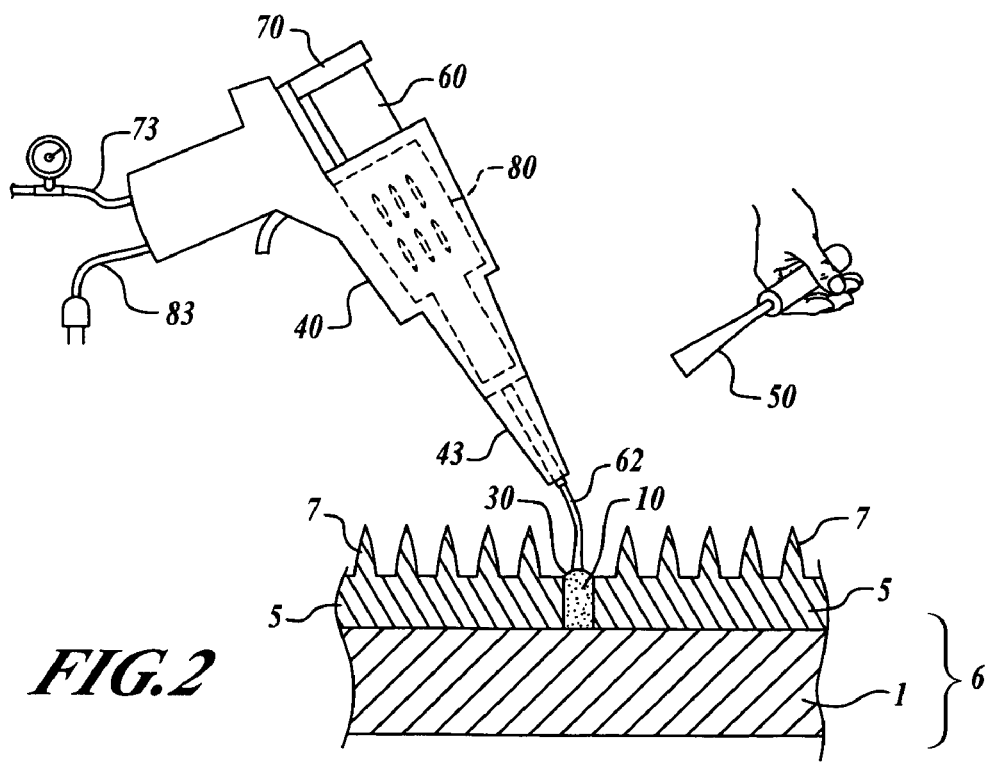
FIG. 2 is a side view of an exemplary application of a gap filler in accordance with an embodiment of the present invention.

FIG. 2 shows an exemplary application of molten thermoplastic 62 to fill a gap 10 in a form 6 in accordance with an embodiment of the present invention. The form 6 includes an underlying tool 1 covered with pinmats 5 (not to scale). The pinmats 5 include a multitude of pins 7 for perforating, by way of example, and not limitation, an aircraft component where an acoustical dampening surface is desired. With the pinmats 5 attached to the tool 1, a gap 10 may occur between adjoining pinmats or between the pinmat and the underlying tool. In this exemplary embodiment, the gap 10 is filled with a thermoplastic material forming a gap filler fill 30 that, by way of example, not limitation, may include the same material as the pinmat 5. For resin fiber aircraft parts, the thermoplastic may include a 20% talc filled polypropylene homopolymer, in this example PD2201, manufactured by M.A. Hanna, of Cleveland, Ohio. The polypropylene is a thermoplastic that softens or melts when heated. The gap filler fill 30 is installed between the adjoining pinmat sections 5 as softened or molten thermoplastic 62 from a high temperature and high pressure dispenser 40 similar to, but operating at a much higher pressure and temperature than, an industrial glue gun.

The dispenser 40 includes a nozzle 43 for dispensing the molten thermoplastic 62. After the molten thermoplastic 62 fills the gap 10, the gap fill 30 can be smoothed if desired in any suitable fashion, including by hand utilizing a spatula or putty knife 50 prior to the molten thermoplastic 62 hardening.

The dispenser 40, by way of example, but not limitation, includes an electrically powered heater 80, a pneumatically powered piston 70 that pressurizes a charge 60 of thermoplastic material being melted and having pressure applied, and a nozzle 43 for discharging the molten thermoplastic 62 to the gap 10 between the pinmats 5. The heater 80 is powered through a power cord 83 to an electrical power source (not shown). The piston 70 is powered by a pressure hose 73 to an air pressure source (not shown). It will be appreciated that the piston 70 may suitably be powered by hydraulic or gear driven mechanisms.

For polypropylene with 20% talc, temperatures exceeding 400° have been found to be suitable for melting this thermoplastic. A temperature of 450° F., plus or minus 10° has been found to suitably soften the polypropylene, while not burning it. The polypropylene material is comparatively thick, even in the melted form, and thus high pressure is suitably applied to force the molten thermoplastic 62 through the nozzle 43. Pressures greater than 100 psi have been found to suitably pressurize the molten thermoplastic 62. A pressure of 400 psi will suitably move the molten thermoplastic 62 through the nozzle 43, and suitable pressures include pressures of 1000 psi or higher. The thermoplastic 62 is applied in a bead, like applying caulking. In an exemplary embodiment of the present invention, the nozzle 43 has a tip opening diameter of 0.05 inches, permitting a bead or stream of similar diameter of molten thermoplastic 62 to be placed into a gap 10 by holding the nozzle 43 proximate to or against the gap 10.

It will be appreciated that the dispenser 40 may be in any suitable configuration for application of molten thermoplastic 62 to gaps 10. By way of example, but not limitation, the dispenser 40 here is configured in the shape of a hand-held gun permitting mobility of the dispenser 40 during application of the thermoplastic material 62 to gaps 10.

Figure 3:
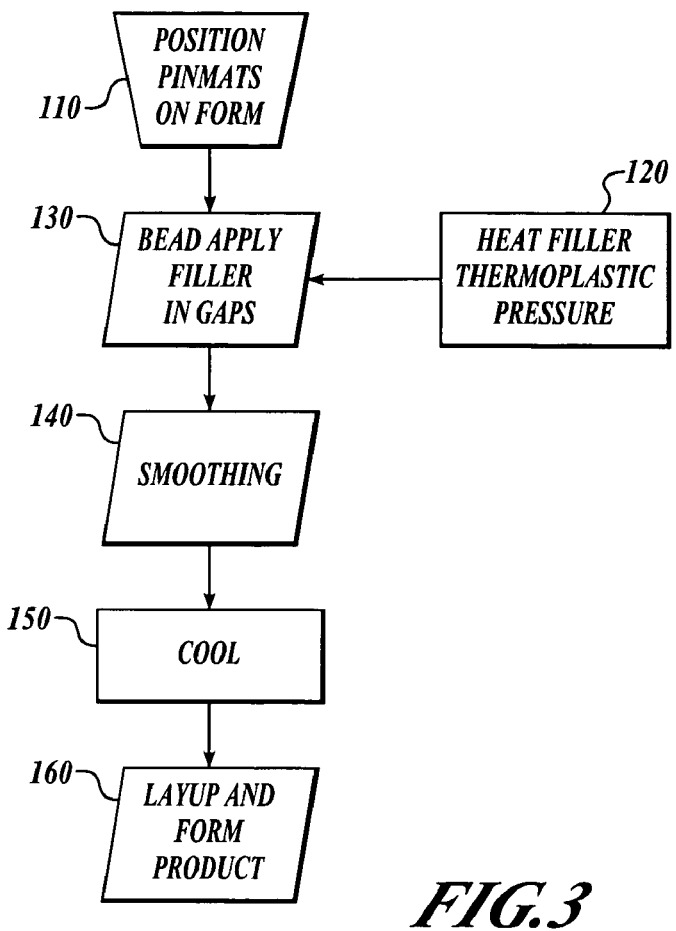
FIG. 3 is a flow chart of an exemplary method of filling form gaps in accordance with an embodiment of the present invention.

FIG. 3 shows a flow chart of an exemplary method 100 of gap filling of forms in accordance with an embodiment of the present invention. At a block 110, pinmats are positioned adjoining each other on an underlying form. Separately, at a block 120, a filler thermoplastic is heated and pressurized. At a block 130, the form with the pinmats has its gaps filled with the application of beads of thermoplastic material in gaps between the pinmats.

In areas where desired, at a block 140, the filler may be smoothed. At a block 150, the filling thermoplastic is allowed to cool. After cooling, the form is advantageously ready for immediate lay-up and forming of a product which is completed at a block 160.

Embodiments of apparatus and methods in accordance with the present invention may provide significant advantages over the prior art. For example, embodiments of the invention may advantageously reduce the labor and expense associated with filling the gaps between pinmats, and may also reduce the expense associated with reworking components manufactured according to the inventive processes. The number of rejected components may be reduced, and the overall quality of the products manufactured using embodiments of the invention may be improved.

Figure 4:
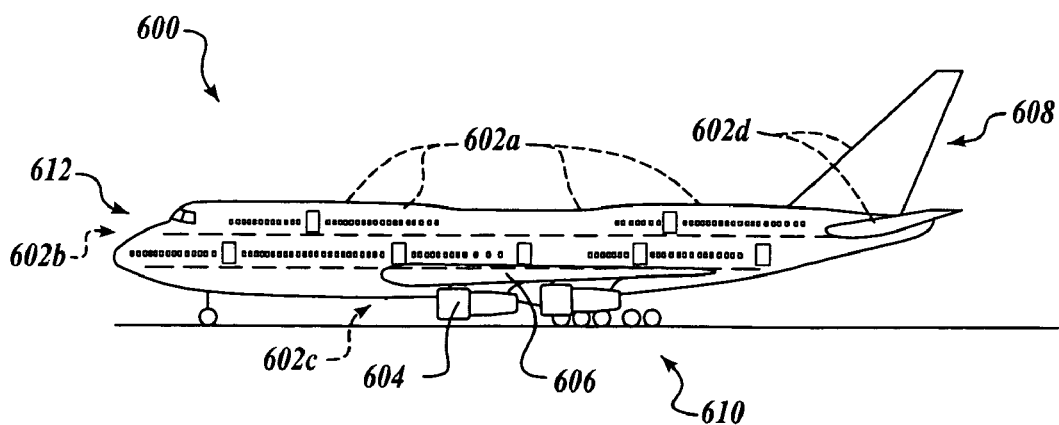
FIG. 4 is a side view of an aircraft manufactured in accordance with an embodiment of the present invention

It will be appreciated that a wide variety of apparatus and methods may be conceived in accordance with alternate embodiments of the present invention to produce a variety of components. For example, FIG. 4 is a side elevational view of an aircraft 600 having one or more composite components 602a-d formed in accordance with alternate embodiments of the present invention. In general, except for the components formed in accordance with the present invention, the various components and subsystems of the aircraft 600 may be of known construction and, for the sake of brevity, will not be described in detail herein.

As shown in FIG. 4, the aircraft 600 includes one or more propulsion units 604 coupled to a fuselage 605, wing assemblies 606 (or other lifting surfaces), a tail assembly 608, a landing assembly 610, a control system 612 (not visible), and a host of other systems and subsystems that enable proper operation of the aircraft 600. It will be appreciated that apparatus and methods in accordance with the present invention may be utilized in the fabrication of any number of contoured or specially textured components 602 of the aircraft 600, including, for example, the various components and subcomponents 602c of the nacelles of the propulsion units 604 such as cowl sections 602c, components and subcomponents of the tail assembly 608 such as rudder and stabilizer components 602d, components and subcomponents of the fuselage 605 such as window and door brackets 602a and nose cones 602b, and any other suitable portion of the aircraft 600. And while the aircraft shown in FIG. 4 is generally representative of a commercial passenger aircraft, the inventive apparatus and methods disclosed herein may also be employed in the assembly of virtually any other types of aircraft. The inventive apparatus and methods disclosed herein may also be employed in the assembly of virtually any other types of aircraft. More specifically, the teachings of the present invention may be applied to the manufacture and assembly of other passenger aircraft, fighter aircraft, cargo aircraft, rotary aircraft, and any other types of manned or unmanned aircraft, including those described, for example, in The Illustrated Encyclopedia of Military Aircraft by Enzo Angelucci, published by Book Sales Publishers, September 2001, and in Jane's All the World's Aircraft published by Jane's Information Group of Coulsdon, Surrey, United Kingdom, which texts are incorporated herein by reference. It may also be appreciated that alternate embodiments of apparatus and methods in accordance with the present invention may be utilized in the manufacture of a wide variety of textured or formed components of, for example, boats, automobiles, canoes, surfboards, recreational vehicles, or any other suitable vehicle or assembly.

While the preferred and alternate embodiments of the invention have been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A method comprising:
   positioning a plurality of pinmats proximate to one another to form at least one gap therebetween;

providing a heating and pressurizing dispenser for a thermoplastic;
at least one of heating and pressurizing a polypropylene thermoplastic in the dispenser;
discharging the polypropylene thermoplastic through a nozzle of the dispenser;
at least partially filling the at least one gap with the polypropylene thermoplastic from the dispenser;
forming a composite aircraft structure against the plurality of pinmats; and
removing the composite aircraft structure from the pinmats.

2. The method of claim 1, further comprising: smoothing the polypropylene thermoplastic after at least partially filling the gap.

3. The method of claim 1, wherein the thermoplastic includes talc.

4. The method of claim 1, wherein the pressurizing includes applying a pressure greater than or equal to 100 psi.

5. The method of claim 4, wherein the pressure is greater than or equal to approximately 400 psi.

6. The method of claim 4, wherein the pressure is greater than or equal to 1000 psi.

7. The method of claim 1, wherein the heating includes heating to a temperature greater than or equal to 400° F.

8. The method of claim 7, wherein the temperature is approximately 450° F.

9. A method comprising:
providing a pinbed having at least one gap;
discharging a polypropylene thermoplastic;
at least partially filling the gap in the pinbed with the discharging polypropylene thermoplastic;
smoothing the polypropylene thermoplastic with a spreader;
forming a product against the filled pinbed; and
removing the product from the pinbed.

10. The method of claim 9, wherein the polypropylene thermoplastic includes talc.

11. The method of claim 9, wherein the polypropylene thermoplastic is pressurized to greater than or equal to approximately 400 psi.

12. The method of claim 9, wherein the polypropylene thermoplastic is pressurized to greater than or equal to 1000 psi.

13. The method of claim 9, wherein the polypropylene thermoplastic is heated to a temperature greater than or equal to 400° F.

14. The method of claim 13, wherein the temperature is approximately 450° F.

15. A method comprising:
providing a plurality of pinmats for forming a composite product, the pinmats including a plurality of textured areas;
aligning the pinmats adjacent to one another, such that one or more gaps are formed between the pinmats;
providing a melting and pressurizing gun for a polypropylene thermoplastic;
at least one of melting or pressurizing the polypropylene thermoplastic in the gun;
discharging the polypropylene thermoplastic from the gun;
at least partially filling the one or more gaps between the plurality of pinmats with the discharging polypropylene thermoplastic from the gun;
smoothing the polypropylene thermoplastic with a spreader;
forming the composite product against the plurality of pinmats; and
removing the composite product from the pinmats.

16. The method of claim 15, wherein pressurizing includes applying a pressure greater than or equal to 400 psi.

17. The method of claim 15, wherein pressurizing includes applying a pressure greater than or equal to 1000 psi.

18. The method of claim 15, wherein the heating includes heating to a temperature greater than or equal to 400° F.

19. The method of claim 18, wherein the temperature is approximately 450° F.

20. The method of claim 15, wherein the composite product includes a resin-fiber aircraft component.

21. The method of claim 20, wherein the composite product includes one of part of an engine cowl and part of an engine nacelle.

* * * * *

UNITED STATES PATENT AND TRADEMARK OFFICE
CERTIFICATE OF CORRECTION

PATENT NO. : 7,575,702 B2  Page 1 of 1
APPLICATION NO. : 10/835371
DATED : August 18, 2009
INVENTOR(S) : Kevin L Obrachta It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1428 days.

Signed and Sealed this

Seventh Day of September, 2010

David J. Kappos
*Director of the United States Patent and Trademark Office*